United States Patent [19]

Boom

[11] Patent Number: 4,724,082
[45] Date of Patent: Feb. 9, 1988

[54] ION EXCHANGE PROCESS HAVING INCREASED FLOW RATES

[75] Inventor: W. Steven Boom, Midland, Mich.

[73] Assignee: The Dow Chemical Company, Midland, Mich.

[21] Appl. No.: 868,166

[22] Filed: May 22, 1986

Related U.S. Application Data

[63] Continuation of Ser. No. 602,040, Apr. 19, 1984, abandoned.

[51] Int. Cl.$^4$ ............................................. B01J 47/02
[52] U.S. Cl. ..................................... 210/679; 210/681
[58] Field of Search ........ 210/679, 682, 681, 683–688; 521/28

[56] References Cited

U.S. PATENT DOCUMENTS

| | | | |
|---|---|---|---|
| 4,124,544 | 11/1978 | Prochazka et al. | 210/682 |
| 4,220,726 | 9/1980 | Warshawsky | 210/679 |
| 4,314,905 | 2/1982 | Etzel et al. | 210/679 |
| 4,333,846 | 6/1982 | Lee et al. | 423/49 |
| 4,431,609 | 2/1984 | Scheitlin | 210/682 |

*Primary Examiner*—Ivars Cintins

[57] ABSTRACT

A process for the increasing of the capacity of kinetics limited ion exchange column wherein an ion exchange resin impregnated with an insoluble, inorganic compound is employed. Because of the increased kinetics and density of the impregnated ion exchange resin, flow rates of the ion-containing medium through the resin may be increased. In addition, the insoluble, inorganic compound often removes certain specific materials from the aqueous stream.

7 Claims, No Drawings

ION EXCHANGE PROCESS HAVING INCREASED FLOW RATES

This is a continuation of application Ser. No. 602,040 filed Apr. 19, 1984, abandoned.

BACKGROUND OF THE INVENTION

This invention relates to an ion exchange operation wherein increased flow rates can be employed.

In many ion exchange systems, a moving stream containing exchangeable ions is flowed through an ion exchange resin bed. Generally, the rate of flow of such liquid through the resin bed is as high as possible in order to obtain the greatest use of the ion exchange bed per unit of time. However, in downflow-type systems, this rate of flow is often limited by the rate at which the ion exchange resin can exchange ions (i.e., the kinetics of the resin). When the flow rate is too high, some or all of the ions desirably removed from the liquid flow past the ion exchange bed before the resin can remove them. Thus, "leakage" of the ions is seen. This leakage is generally highly undesirable. In conventional ion exchange systems, this leakage is cured by reducing the flow rates of the liquid through the column, by increasing the length of the column, or by adding additional column(s) to the system.

In upflow-type systems, a major limitation of this system has been the low density of conventional ion exchange resins. Because of this low density, the resin bed would be swept upward by the rising liquid and out of the column. Recently, higher density ion exchange resins have been developed which have highly cross-linked or brominated copolymer matrices in order to reduce this loss of resin in upflow-type systems. Unfortunately, however, it has been found that in many applications the expected increase in the operating flow rates when such high density resins are employed cannot be achieved without substantial leakage of the ions by the column. Such leakage is due to the slow kinetics of these higher density resins.

Accordingly, an ion exchange system which can be operated at high flow rates without substantial leakage or loss of resin, would be highly desirable.

SUMMARY OF THE INVENTION

The present invention is such an improved ion exchange system. The present invention is an improvement in a process to remove ions from an ion-containing liquid medium whereby said liquid medium is flowed through an ion exchange column containing an ion exchange resin and wherein the rate of flow of said liquid medium through said column is limited by the rate at which said resin exchanges ions. This improvement comprises employing in said column an impregnated ion exchange resin which is a water-insoluble, hydrophilic organic polymer having a plurality of active ion exchange sites and having dispersed therein a quantity of a water-insoluble inorganic compound sufficient to measurably increase the rate of which said resin exchanges ions. Because these impregnated resins exchange ions more rapidly than conventional ion exchange resins, ion exchange processes employing such impregnated resins can be operated using higher flow rates than columns using conventional ion exchange resins. In addition, said impregnated resins generally exhibit a higher density than conventional ion exchange resins. Accordingly, said impregnated resins are particularly useful in kinetics limited upflow-type systems wherein both the increased kinetics and increased density of said impregnated resins increase the rate at which the column can be operated.

DETAILED DESCRIPTION OF THE INVENTION

The ion exchange systems for which the present invention is an improvement are termed herein "kinetics limited" systems. In such systems, the flow rate of a liquid medium containing exchangeable ions is limited by the rate at which the ion exchange resin employed therein exchanges the ions. Such kinetics limited systems are generally characterized in that incomplete removal of the ions to be exchanged is seen when the operating flow rate of the fluid is too high. Such leakage is generally reduced in such systems by reducing the flow rate of the fluid through the resin.

The kinetics of an ion exchange resin refers to the rate at which said resin can exchange ions. Various experimental procedures are available by which the kinetics of any particular ion exchange resin may be evaluated. A simple exemplary test for determining resin kinetics is as follows: a 10 ml sample of a wet strong acid cation exchange resin is converted to the hydrogen form. An amount of the resin containing about 10 milliequivalents (meq) of active ion exchange sites is slurried in about 200 ml of deionized water in a beaker containing a pH probe. Sodium hydroxide solution containing about 2.0 milliequivalents of sodium hydroxide is added to the slurry and the time measured until the pH of the slurry returns to 7. A second aliquot of sodium hydroxide solution, again containing about 2.0 milliequivalents NaOH is added and the time until the pH returns to 7 is again measured. The kinetics of the resin are expressed as the quotient of the total milliequivalents of sodium hydroxide added to the slurry divided by the total amount of time required to neutralize the sodium hydroxide.

To determine the kinetics of an anion exchange resin, the foregoing test is again employed, using HCl instead of NaOH. The anion exchange resin is converted to the hydroxide form for testing.

The present invention is based on the surprising discovery that an ion exchange resin which is impregnated with an insoluble, inorganic compound exhibits faster ion exchange kinetics than the corresponding conventional ion exchange resin which is not so impregnated. Often, the impregnated resin will exchange ions at a rate which is from about 1.1 to about 4 or more, preferably from about 2 to 4 times as fast as a similar resin which is not impregnated. Accordingly, when such impregnated resin is employed in an ion exchange system wherein the rate at which the system is operated is limited by kinetics of conventional ion exchange resins, faster flow rates can be employed.

The ion exchange resins suitably employed herein comprise a water-insoluble, copolymeric matrix having attached thereto a plurality of active ion exchange sites. The ion exchange sites may be either cation exchange moieties or anion exchange moieties. Cation exchange moieties are generally strong or weak acid groups, such as sulfonic acid, carboxylic acid, phosphonic acid or like groups. Anion exchange groups are generally strongly or weakly basic groups, such as tertiary amine, quaternary ammonium, phosphonium, sulfonium and like groups. The resin generally contains sufficient of such active ion exchange groups to impart thereto a concentration of ion exchange sites in the range from about 0.5 to about 12 meq/gram dry resin and in some cases, preferably from about 4 to about 5.5 meq/gram of dry resin.

The polymeric backbone is not particularly critical as long as the resultant polymer is water-insoluble. Accordingly, the polymer may be of phenolic, polyethylenic, styrenic or acrylic polymers, or of any other type which carries or can be made to carry active ion exchange sites. Preferred polymers in the practice of the present invention are crosslinked polymers formed by the addition copolymerization of polymerizable monoethylenically unsaturated monomer or a mixture of such monomer with a crosslinking agent copolymerizable therewith. Typically, the crosslinking agent is a polyethylenically unsaturated monomer such as divinylbenzene. Suitable polymerizable monoethylenically unsaturated monomers, crosslinking agents, catalysts, polymerization media and methods for preparing the crosslinked addition copolymer in suitable particulate form are well known in the art and reference is made thereto for the purposes of this invention. Illustrative of such patents are U.S. Pat. Nos. 2,960,480; 2,788,331; 2,642,417; 2,614,099 and 2,591,573, which teach the preparation of gel-type crosslinked polymers. In addition, U.S. Pat. Nos. 3,637,535; 3,549,562 and 3,173,842, teach the preparation of more porous resins (often called macroporous resins) which are also suitably employed herein. Of the known polymerizable monoethylenically unsaturated monomers, the monovinylidene aromatics, such as styrene and monoalkylsubstituted styrenes, such as monovinyltoluene, ethylvinylbenzene and vinyl naphthalene, are preferred, with styrene being especially preferred. Preferred crosslinking agents include polyvinylidene aromatics, such as divinylbenzene, divinyltoluene, divinylxylene, divinylnaphthalene, trivinylbenzene, divinyldiphenyl ether, divinyldiphenyl sulfone, and diisopropenylbenzene; ethylene glycol dimethacrylate and divinylsulfide, with the polyvinylidene aromatics, especially divinylbenzene being most preferred. Examples of such especially preferred cation exchange resins are those sold under the brand names DOWEX® MSC-1 ion exchange resin, DOWEX 50WX2 ion exchange resin, DOWEX 50WX4 ion exchange resin, DOWEX HGR, DOWEX HCR, DOWEX MWC-1 and DOWEX CCR-2, by The Dow Chemical Company. In addition, examples of especially preferred anion exchange resins are those sold under the brand name DOWEX SBR, DOWEX SBRP, DOWEX 11, DOWEX SAR, DOWEX MSA-1, DOWEX MSA-2 and DOWEX MWA-1 sold by The Dow Chemical Company.

Most advantageously, the ion exchange resin is in the form of a porous particulate. Preferably, the particulate has an average particle diameter from about 10 to about 1200 microns, especially from about 500 to about 1200 microns. The ion exchange resin is sufficiently porous to permit the transport of exchangeable ions from an aqueous medium to the interior regions of the particles and to permit the impregnation thereof with the insoluble inorganic compound.

The ion exchange resin is impregnated with a quantity of a water-insoluble, inorganic compound such that the exchange kinetics of the resin are measurably increased. "Impregnated", as that term is used herein, means that the ion exchange resin contains within its pores the insoluble compound in a particulate or finely divided form. The quantity of the insoluble compound required to measurably increase the kinetics of the resin may vary somewhat according to the type of resin and the particular insoluble compound employed. In general, however, the resin is desirably impregnated with about 0.05 to about 1.0 or more times its weight of the insoluble compound. When too high an amount of the insoluble compound is present, the kinetics of the resin are found to decrease.

Various insoluble inorganic compounds are usefully employed in the impregnated resins in this invention. In general, an inorganic compound is insoluble for the purposes of this invention when less than 2 grams, preferably less than 0.1 gram of the compound will dissolve in a liter of water. Various such insoluble inorganic compounds have been shown to be capable of being deposited into ion exchange resins. See, for example, U.S. patent application Ser. No. 289,615, filed Aug. 3, 1981; and U.S. Pat. No. 4,333,846 issued June 8, 1982. Exemplary such compounds include inorganic salts, such as $BaSO_4$, $AgCl$, $CuO$, $HgS$, $Fe(OH)_3$, $Sn(OH)_4$, $Pb(OH)_4$, $PbS$, $PbO(OH)_2$, $Cu_2O_3.H_2O$, $Al(OH)_3$, $CuS$ and $ZrO(OH)O$; inorganic complexes such as $ZrO(H_2PO_4)_2$, $PbO(H_2PO_4)_2$, $LiCl.2Al(OH)_3$, $CuCl_2.2Al(OH)_3$, $NiCl_2.2Al(OH)_3$, $MgCl_2.2Al(OH)_3$; silicon dioxide; and the reaction products of polymeric amorphous hydrated zirconium oxides and phosphate ions. Preferably, the inorganic compound is a salt of barium, mercury, lead, silver, copper, cobalt or iron. It is understood that the foregoing is not presented or intended as a complete listing of suitable insoluble inorganic compounds. Further, it is understood that certain of the foregoing compounds may be present within the resin as hydrates, although, in general, there are six or fewer, more generally four or fewer, waters of hydration associated with such insoluble inorganic compounds.

Methods for the impregnation of ion exchange resins with insoluble inorganic compounds are fully described in U.S. patent application Ser. No. 289,615, and U.S. Pat. No. 4,333,846. As a general matter, water-insoluble salts are deposited within cation exchange resins by treating the resin with a solution of a soluble compound containing the cation of the insoluble compound desirably deposited within the resin, then contacting the cation-containing resin with a solution of a material which reacts with the cation to form a water-insoluble salt within the pores of the ion exchange resin. In preparing an anion exchange resin impregnated with water-insoluble salts, the resin is desirably contacted with an aqueous solution containing an anion of the material which is desirably deposited within the resin and then contacting the anion-containing resin with an aqueous solution containing a metal ion which reacts with the anion to form an insoluble precipitate within the pores of the resin. Aluminate complexes are advantageously formed within macroporous resins by contacting the resin with an aluminum chloride solution, converting the aluminum chloride to aluminum hydroxide by treating with base, contacting the aluminum hydroxide-containing resin with a transition metal chloride, and heating the mixture until the aluminate complex is formed.

In addition to enhancing the kinetics of the resin impregnated therewith, the insoluble organic compound generally increases the density of the ion exchange resin. Accordingly, these impregnated resins are especially useful in kinetics limited upflow-type systems wherein both their increased density and increased kinetics may be put to advantage. In general, impregnation of the ion exchange resin with an amount of insoluble inorganic compound such that the kinetics of the resin are increased will also result in an increase of about 1 to about 40 percent in the density of the resin.

Another advantage of the resins employed herein is that in some cases the insoluble inorganic compound is itself a sorbent for specific materials. For example, it is taught in U.S. patent application Ser. No. 289,615, that insoluble compounds, such as barium sulfate, are sorbents for specific metals such as radium. In U.S. Pat. No. 4,333,846, resins impregnated with transition metal aluminate complexes are said to be useful to selectively absorb transition metal halides from aqueous solutions thereof. Accordingly, these resins may be employed in kinetics limited systems both to exchange ions and to remove trace quantities of materials which are absorbed by the insoluble compound which may be present in the aqueous stream to be treated.

In the process of this invention, the impregnated resin is employed under the same conditions as conventional ion exchange resins except, of course, that the operating flow rates of the ion exchange column may be increased due to the increased kinetics and density of the impregnated resins. Methods for proper operation, including regeneration, of an ion exchange column for various purposes are well known to those in the relevant arts. The operating flow rates of the process of this invention may be increased relative to the flow rates of conventional processes until leakage of the ions desirably exchanged by the column is seen or in the case of certain upflow-type systems, resin loss is seen.

One particularly useful application for the present invention is in condensate polishing wherein large amounts of water containing small amounts of exchangeable ions are to be treated. In conventional condensate polishing systems, it is desirable to flow the water to be treated as rapidly as possible through the ion exchange bed and the rate of the flow is commonly restricted by the exchange kinetics of the resin. By employing the present process in condensate polishing operations, significantly faster flow rates may be employed.

The following examples are provided to illustrate the invention but not to limit the scope thereof. All parts and percentages are by weight unless otherwise indicated.

EXAMPLE 1

Example 1 illustrates the operation and enhanced kinetics of a gel cation exchange resin impregnated with barium sulfate. In this example, the ion exchange resin employed has a polystyrene backbone crosslinked with 2 weight percent divinylbenzene having sulfonic acid functionalities. The dry weight capacity of the resin is 5.00 meq H⊕ per gram. To 100 g of wet resin (75 weight percent water) are added 250 ml of a 0.5 N barium hydroxide solution in order to neutralize the resin and convert it to the barium form. A volume excess of 6 molar sulfuric acid is added to the resin with mixing. The mixture is allowed to set at room temperature for 2 hours and then the excess acid is filtered off. This addition of acid causes barium sulfate to precipitate within the resin beads and simultaneously regenerates the resin to hydrogen form. The impregnated resin is then washed in water to remove residual acid. The wet specific gravity of the starting resin is about 1.10 g/ml. After impregnation with barium sulfate, the density of the resin is increased to 1.20 g/ml.

The kinetics of the impregnated resin are evaluated using the procedure described hereinbefore for evaluating the kinetics of cation exchange resins. The first 2 meq of sodium hydroxide solution are neutralized in 1.53 minutes. The second 2.0 meq of sodium hydroxide are neutralized in 1.55 minutes. The neutralization rate is thereby calculated as 4 meq of sodium hydroxide neutralized in 3.08 minutes or 1.30 meq NaOH neutralized per minute. For comparison, a sample of the original resin is evaluated and found to neutralize sodium hydroxide at the rate of 0.65 meq per minute. Accordingly, it is seen that after impregnation, the kinetics of the impregnated resin are increased by a factor of 2.

EXAMPLE 2

This example illustrates the preparation and enhanced kinetics of a gel-type anion exchange resin impregnated with barium sulfate. The ion exchange resin employed in this example has a polystyrene backbone crosslinked with 0.3 weight divinylbenzene and having pendant trimethylammonium moieties. The dry weight capacity of the original resin is 4.45 meq of chloride per gram. One hundred grams of the wet ion exchange resin (water retention capacity is 91.2 percent) are converted to the sulfate form by contacting a volume excess of the resin with an excess of a 5 percent sulfuric acid solution in a glass column. The sulfate form of the resin is then backwashed with deionized water, filtered and placed into about 200 ml of a saturated solution of barium chloride, thereby precipitating barium chloride within the resin bead and simultaneously regenerating the resin to the chloride form. Excess barium chloride solution is removed by filtration and the resin is backwashed with deionized water to remove residual barium chloride. The original resin has a wet specific gravity of 1.01 grams per milliliter. After impregnation, the density of the resin is increased to 1.05 grams per milliliter. The ion exchange kinetics of the resin are evaluated using the test described hereinbefore. The impregnated resin neutralizes hydrochloric acid at a rate of 1.83 meq per minute. By contrast, the original resin neutralizes hydrochloric acid at a rate of 1.37 meq per minute. Accordingly, it is seen that the kinetics of the impregnated resin are approximately 35 percent faster than those of the original resin.

EXAMPLE 3

In this example is illustrated the preparation and enhanced kinetics of a macroporous anion exchange resin impregnated with barium sulfate. The starting resin has a macroporous polystyrene backbone which is crosslinked with 5.5 weight percent divinylbenzene. The functional groups are trimethylammonium moieties. The resin is contacted with an excess of 20 weight percent aqueous solution of sulfuric acid thereby converting the resin to sulfate form. The sulfate form of the resin is then backwashed with deionized water to remove residual acid, filtered and then placed into 200 ml of a saturated barium chloride solution thereby precipitating barium sulfate within the resin bead and regenerating the resin to its chloride form. Excess barium chloride solution is removed by filtration and the resin is then washed with deionized water to remove residual barium chloride. The original resin has a wet specific gravity of 1.06 grams per milliliter. The impregnated resin has a wet specific gravity of 1.20 grams per milliliter. The ion exchange rate of the original resin was 0.32 meq per minute. After impregnation the exchange kinetics are increased to 1.28 meq per minute. In this example, the kinetics of the original resin are increased by a factor of 4 after impregnation with barium sulfate.

EXAMPLE 4

The sample of the same type resin as used in Example 1 is converted to its silver form by passing a 0.1N $AgNO_3$ solution through the resin until breakthrough is observed. The silver form resin is then backwashed, filtered, and immersed in a 2:1 volume excess of 8 normal HCl. AgCl is thereby precipitated inside the resin with the resin being simultaneously regenerated to the hydrogen form. The rate of ion exchange is 0.94 meq/min for the impregnated sample versus 0.49 meq/min for the starting resin.

EXAMPLE 5

A volume of resin equivalent to 20 milliequivalents of acid capacity was used to determine operating capacity. The DOWEX 50WX2 resin has virtually the same operating capacity as its $BaSO_4$ impregnated counterpart (~2 lbs. $NaOH/ft^3$ resin) However, the impregnated resin, being more dense and having a faster rate of ion exchange allowed almost twice the flow rate, 60 ml/min compared to 35 ml/min, at 100 percent expansion. It was also noted that breakthrough was sharper for the impregnated resin, which is an additional desirable property.

What is claimed is:

1. In a process for removing ions from an ion-containing aqueous medium, wherein said aqueous medium is flowed through an ion exchange column containing an ion exchange resin and wherein the rate of flow of said aqueous medium through said column is limited by the rate at which the resin exchanges ions, the improvement comprising employing in said column an impregnated ion exchange resin which is a water-insoluble, hydrophilic organic polymer having a plurality of active ion exchange site and having dispersed therein a quantity of a water-insoluble, inorganic compound selected from the group consisting of the insoluble salts of barium, lead, mercury and silver, such that the rate at which said ion exchange resin exchanges ions is from about 1.1 to about 4 times as fast as the rate at which ion exchange resins which have not been impregnated with a water-insoluble inorganic compound exchanges ions.

2. The improved process of claim 1 wherein the ion exchange resin is an anion exchange resin.

3. The improved process of claim 2 wherein the anion exchange resin contains a plurality of tertiary or quaternary ammonium groups.

4. The improved process of claim 1 wherein the ion exchange resin is a cation exchange resin.

5. The improved process of claim 4 wherein the cation exchange resin contains a plurality of sulfonic acid or carboxylic acid groups.

6. The improved process of claim 1 wherein the ion exchange resin is a macroporous resin.

7. The improved process of claim 1 wherein the ion exchange resin is a gel resin.

* * * * *